Jan. 11, 1938.    F. C. BEST    2,104,723
MOTOR VEHICLE
Filed Oct. 24, 1932    2 Sheets-Sheet 1
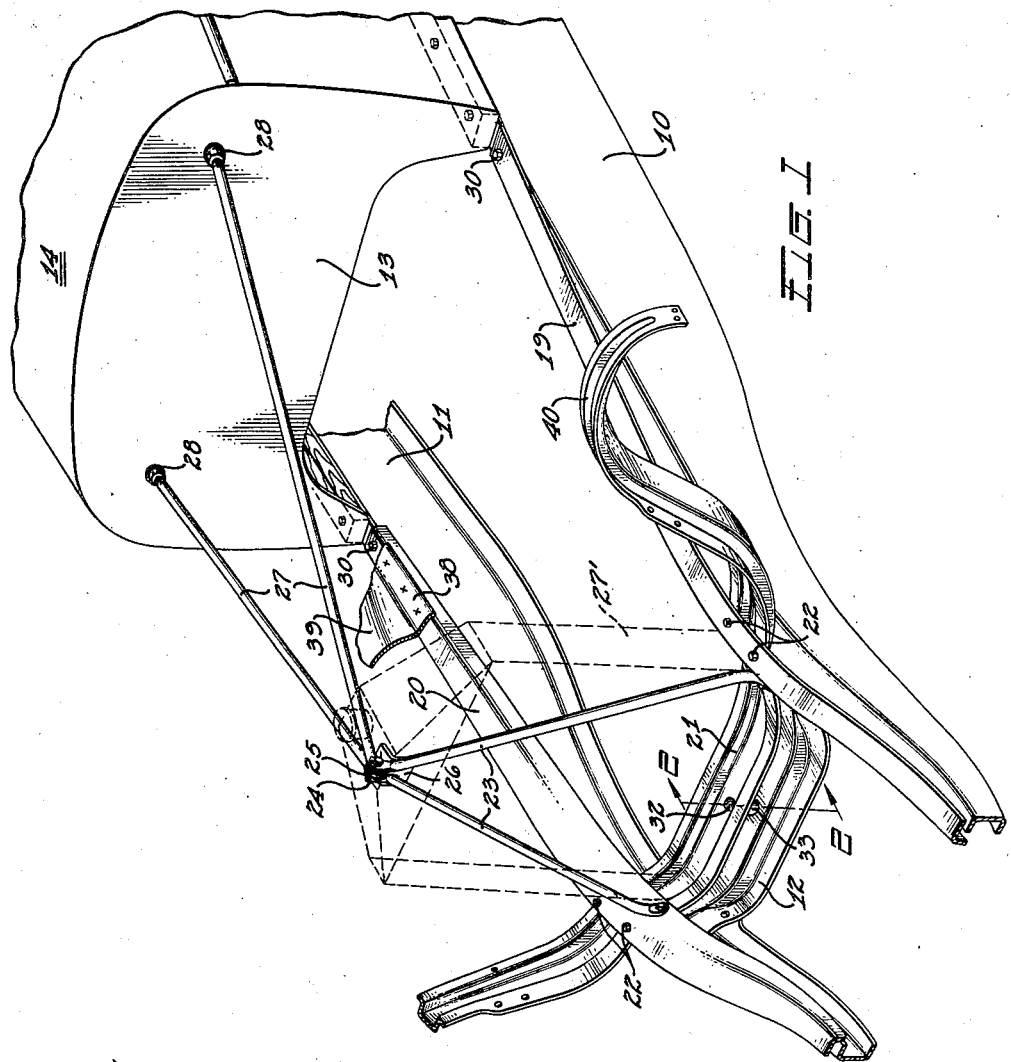
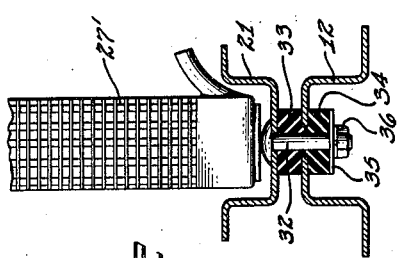
Inventor
FRANK C. BEST.
By
Attorney Jan. 11, 1938.  F. C. BEST  2,104,723
MOTOR VEHICLE
Filed Oct. 24, 1932  2 Sheets-Sheet 2

Inventor
FRANK C. BEST.
By
Attorney

Patented Jan. 11, 1938

2,104,723

UNITED STATES PATENT OFFICE 2,104,723

MOTOR VEHICLE

Frank C. Best, Detroit, Mich., assignor to Packard Motor Car Company, Detroit, Mich., a corporation of Michigan Application October 24, 1932, Serial No. 639,251

4 Claims. (Cl. 280—152)

This invention relates to motor vehicles and more particularly to vehicle front end construction.

It is the usual practice to rigidly mount the fenders, the radiator assembly and the lamps of a motor vehicle on the forward end of a fabricated main frame structure. Because of this manner of mounting, the fenders, radiator and lamps are subjected to torsion of the front end of the main frame so that they move with the main frame when the vehicle is traveling along uneven road surfaces. Such torsional movement increases in accordance with the road speed of the vehicle, and while such movement resulting from frame torsion has been recognized as being undesirable still the road speeds in the past have been such that this movement has not been too objectionable. With the present day vehicles, however, the road speeds have been increased generally to an extent which makes the movement of the radiator, the fenders and the lamps, resulting from torsion in the forward end of the main frame, decidedly objectionable because of the sensibility of the driver and occupants of the vehicle thereto as well as deleterious mechanical reactions. This condition obviously can be reduced in its severity through increasing the strength of such an integral supporting structure but this is undesirable because of the additional weight which is prohibitive from a commercial viewpoint.

An object of my invention is to provide a front end mounting structure for motor vehicles whereby the fenders, the radiator assembly and the lamps can be supported so that they do not follow torsional movement of the forward end of the main frame.

Another object of my invention is to provide a front fender mounting for motor vehicles which is arranged so that it is in substantially a fixed position relative to the body.

A further object of my invention is to provide a radiator assembly support which will remain stationary relative to the body at any vehicle speed irrespective of the torsional movement of the forward end of the main frame.

Yet another object of my invention is to provide a supporting structure at the forward end of a motor vehicle for carrying the fenders, the radiator assembly and the lamps, which has a substantially floating relation with the forward end of the main frame.

Other objects of the invention will appear from the following description taken in connection with the drawings, which form a part of this specification, and in which:

Fig. 1 is a perspective view of the forward end of a motor vehicle having my invention incorporated therewith, the engine and hood being left out for sake of clearness;

Fig. 2 is a sectional view of the bottom radiator mounting taken on line 2—2 of Fig. 1;

Figure 3:
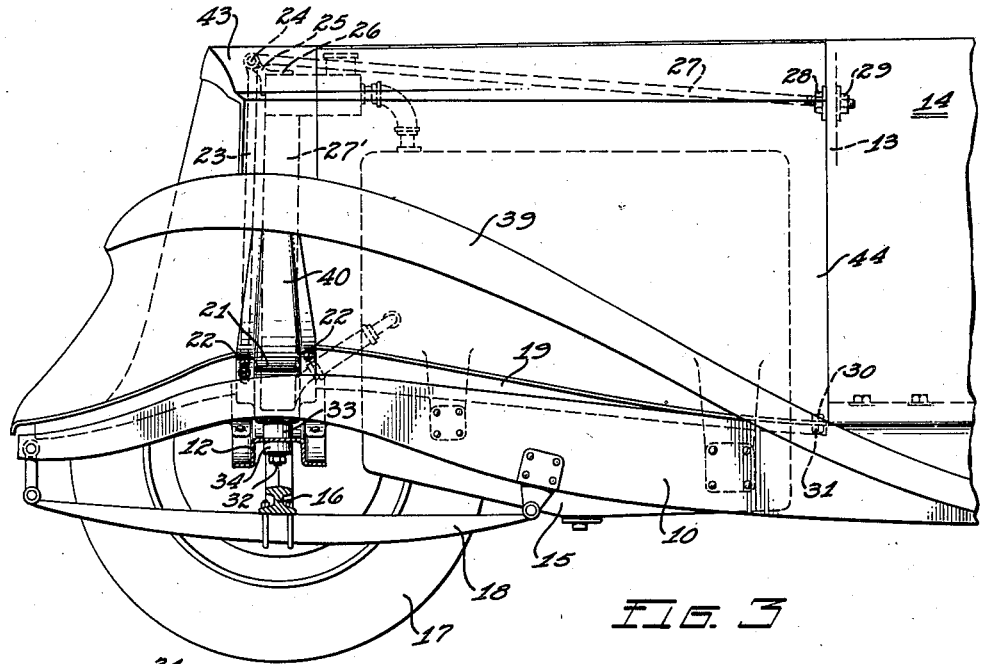
Fig. 3 is an elevational view, partly in section, of one side of the forward end of a motor vehicle incorporating my invention.
Figure 4:
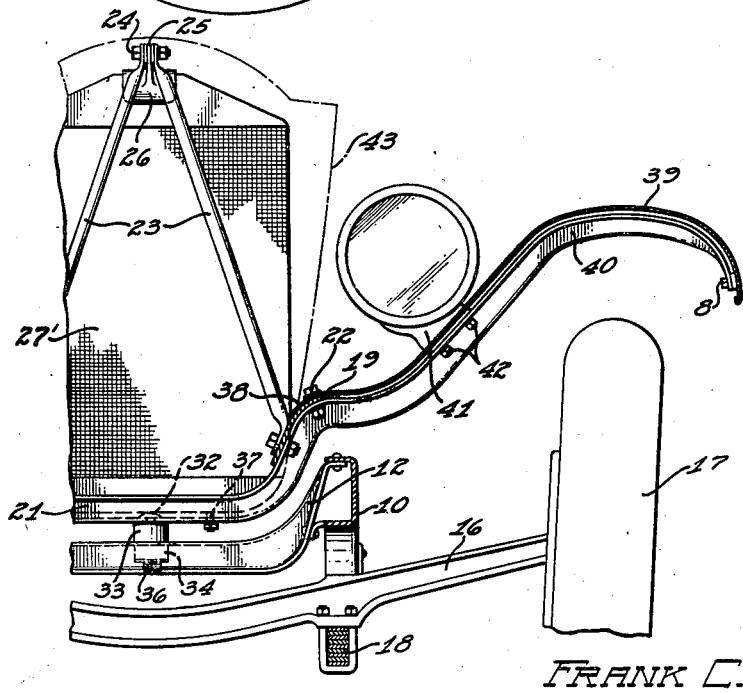
Fig. 4 is a partial front elevational view of a motor vehicle, partly in section, illustrating the auxiliary supporting structure.

Referring to the drawings by characters of reference, 10 and 11 represent the longitudinally extending channel beams or sills and 12 the front cross brace connecting the sills, such structure being a part of a conventional form of fabricated main frame employed with motor vehicles. Secured on the main frame is a conventional form of dash 13 and body structure 14, and in advance of the dash and secured to the sills 10 and 11, in a conventional manner, is an internal combustion engine as indicated at 15 in Fig. 3. The usual front axle 16, carrying wheels 17, extends beneath the forward end of the frame and is connected therewith by springs 18.

When the vehicle travels along an uneven surface, the forward end of the fabricated main frame will be subjected to torsional movement which increases in magnitude as the speed of the vehicle increases so that those parts of the vehicle which are tied integrally to the forward end of the main frame will move therewith. It is the main purpose of this invention to provide a support for such elements whereby they will not move torsionally with the forward end of the main frame but will, at all speeds, remain in a substantially stationary relation with the body whereby the driver and occupants of the vehicle are not conscious of the torsional movement occurring in the main frame.

To this end, I provide an auxiliary frame structure which is carried so that it will support the radiator assembly, the fenders and the lamps in a stationary relation relative to the body. This auxiliary or sub-frame includes a pair of rails 19 and 20 which overlie a forward portion of the main frame sills 10 and 11 and a transverse channel 21 which is bolted, as indicated at 22, to the forward end of the rails. Fixed by bolts at their lower ends to the rails 19 and 20, preferably forwardly of the channel member, is a pair of rods 23 which extend upwardly and are pivotally mounted on a pin 24 which is carried by an arm 25 projecting from a plate 26 fixed to the radiator core 27'. On the same pin 24 is pivotally mounted the forward ends of a pair of rods 27 which are secured at their rear ends to the dash by means of nuts 28 and 29. The two sets of rods 23 and 27 provide two triangular structures which form a part of the auxiliary frame structure and serve as a bracing and tie means therefor.

The rear ends of the rails 19 and 20 are secured on the top flange of the main frame sills by bolts 30 and nuts 31, these connections being of such a nature that the rails can pivot slightly at these points. A bolt 32 extends through the central portion of the channel 21 and the cross brace 12 which extends therebeneath, there being a rubber spacer 33 between the channel and the cross brace, and a rubber spacer 34 between the cross brace and a washer 35 which is retained by the nut 36 on the lower end of the bolt 32. The channel 21 thus has a movable resilient single point connection with the cross brace of the main frame which together with the pivotal connection at the rear end of the rails provide a three point connection between the sub-frame and the main frame. The portion of the main frame adjacent the rear connections is braced by the body and the dash so that there is very little torsional movement thereof, but as the forward end of the main frame channels are connected by cross members similar to brace 12, there can be considerable torsional movement of the main frame at this point. As the auxiliary frame has a single central connection at its forward end with the main frame, which is resiliently mounted, and two pivoted connections at its rear end, it has substantially a floating relation with the main frame and a substantially stationary relation with the body.

The lower end of the radiator core 27' extends into the channel member 21 between the rails 19 and 20 and is secured thereto by bolts 37 and, as previously described, the upper end of the core is secured to the auxiliary frame by means of the pin 24 which is carried by the arm 25 of the bracket 26 to which the rods 23 and 27 are connected.

The rails 19 and 20 are mounted in a plane above the main frame sills, except at the extreme rear ends, through means of the spacer 33 and the bottom flange 38 of the front fenders 39 rest on and are spot welded, or bolted, to the rails. The ends 40 of the channel member 21 are curved upwardly and outwardly in the form of the flaring front end of the fenders and act as a support therefore, the fenders being secured to the channel ends by bolts 8 or other suitable means. It will thus be seen that the front fenders are carried entirely by the auxiliary frame structure and are connected with the main frame so that they do not move torsionally with the forward end thereof but remain substantially stationary relative to the body.

Lamp carrying brackets 41 are secured directly to the channel extensions 40 by means of bolts 42. As the lamps are fixed entirely to the sub-frame, they will likewise not be subjected to torsional movement of the forward end of the main frame and will remain substantially in a constant position relative to the vehicle body during torsional movement of the main frame.

It will be understood that the horn and other visible accessories can be fixed directly to this auxiliary frame so that they will not move torsionally with the forward end of the main frame. Through means of the auxiliary supporting structure herein described, a person within or exteriorly of the vehicle will not be conscious of any torsional movement of the vehicle main frame.

It will also be evident that through the hinged connection at the rear end of the auxiliary frame and the pivotal connection of the brace rods at the top of the radiator core, the auxiliary frame will be able to move in a vertical plane when the main frame flexes in this direction, as it will when a severe bump is encountered such as in crossing a railroad track. Such movement of the main frame is, however, very slight and will not result in a severe bending moment at the anchored rear ends of the rails or of the rods 27 which have some flexibility.

The radiator shell 43 can be placed over the core and the conventional hinge pin can be supported by the rear end of the shell and the dash to receive the hood sections, one of which is indicated at 44. By unfastening the rods 27 from the dash, unfastening the bolts 30, the nut 36, and the water hose connections between the engine and the radiator, the entire auxiliary frame including the brace members together with the radiator assembly, fenders and lamps can be removed as a unit from the vehicle so that assembly and disassembly are materially facilitated. In addition, each rail of the sub-frame can be detached by unfastening the bolts 8, 22, 30 and 42, and thus if the fender is welded to a rail and replacement is necessary, another rail and fender can be readily substituted without disturbing the other adjacent parts of the vehicle.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a motor vehicle, the combination with a main frame and a dash, of an auxiliary front fender carrying frame having a pivoted connection at the rear end and a rocking connection at its forward end with the main frame, a radiator fixed on the auxiliary frame, and pairs of brace rods pivoted to the radiator, one pair of rods being fixed to the dash and the other pair of rods being fixed to the auxiliary frame.

2. In a motor vehicle having a main frame and a dash, an auxiliary frame movably mounted on the main frame, a radiator fixed at its bottom on the auxiliary frame, a pair of brace members fixed to the auxiliary frame and pivoted to the upper portion of the radiator and another pair of braces fixed to the dash and pivoted to the upper portion of the radiator, said brace members being pivoted to allow movement of the radiator and frame in a vertical plane.

3. In a motor vehicle having a main frame and a dash, an auxiliary frame pivotally mounted on the main frame, a radiator fixed at the bottom portion to the auxiliary frame, a pin carrying bracket fixed to the upper portion of the radiator, brace rods extending in a substantially vertical plane, said rods being fixed at one end to the sides of the auxiliary frame and pivoted at the other end on the pin, and horizontally extending brace rods fixed at one end to the dash and pivoted at the other ends on the pin.

4. In a motor vehicle, the combination with a main frame and a dash, of an auxiliary front fender carrying frame having pivoted connections at the rear end and a rocking connection at its forward end, a radiator fixed on the auxiliary frame, and pairs of angularly disposed brace rods having their apex portions pivoted at the top of the radiator, the diverging ends of one pair of brace rods being fixed to the dash and the diverging ends of the other pair of rods being fixed to the auxiliary frame.

FRANK C. BEST.